Nov. 6, 1962　　　F. B. BUSHONG　　　3,062,578
EGG HANDLING APPARATUS
Filed April 3, 1959　　　4 Sheets-Sheet 1

INVENTOR
Forest B. Bushong

BY Mason, Fenwick & Lawrence
ATTORNEYS

INVENTOR
Forest B. Bushong

BY Mason, Fenwick & Lawrence
ATTORNEYS

Nov. 6, 1962 F. B. BUSHONG 3,062,578
EGG HANDLING APPARATUS
Filed April 3, 1959 4 Sheets-Sheet 3

INVENTOR
Forest B. Bushong
BY Mason, Fenwick, & Lawrence
ATTORNEYS

Nov. 6, 1962  F. B. BUSHONG  3,062,578
EGG HANDLING APPARATUS
Filed April 3, 1959  4 Sheets-Sheet 4

INVENTOR
Forest B. Bushong
BY Mason, Fenwick & Lawrence
ATTORNEYS 3,062,578
Patented Nov. 6, 1962

3,062,578
EGG HANDLING APPARATUS
Forest B. Bushong, Woodstock, Va., assignor to Shaffer Manufacturers, Inc., Maurertown, Va., a corporation of Virginia
Filed Apr. 3, 1959, Ser. No. 804,041
15 Claims. (Cl. 294—65)

This invention relates to article handling apparatus, and more particularly to such apparatus for use in handling eggs.

Eggs for use in hatcheries are shipped to the hatchery in one of the usual types of egg shipping cases. The present invention will be described with respect to vacuum type egg pick-up apparatus for picking up eggs from a twenty-four dozen egg case and placing them in a hatchery tray. The twenty-four dozen egg case has eight rows of six eggs each to the layer, and there are six layers of eggs to the case.

The present invention may be readily adapted for use with the thirty dozen egg case. This case has a central divider. On each side of the divider there are five layers, each layer having six rows of six eggs to the row. Another thirty dozen egg case is similarly constructed, but has only five rows of six eggs each to a layer, and there are six layers on each side of the divider. Separators are used in the crates to provide a compartment or cell for each egg, so that it will not contact other eggs and cause breakage. Such separators are commonly of the molded pulp board type and in the twenty-four dozen case, spaces are provided for forty-eight eggs in regular longitudinal and transverse rectilinear rows of six cells across one dimension of the separator and eight cells across the other dimension.

Eggs are commonly transferred from the egg cases in which they are shipped, to the trays of the hatchery incubators by hand, and it is a very time consuming operation. Hatchery trays differ according to the type of incubator used, but 75% of the incubators in use employ trays in which the rows of eggs are staggered, and the present invention is directed to egg handling apparatus for use in transferring eggs from an egg shipping case to a hatchery tray in which the eggs in one row will be staggered with respect to eggs in adjacent rows. In other words, the eggs are not arranged in regular rectilinear rows in the hatchery trays, as they are in egg cases, but instead the eggs in one transverse row are staggered with respect to the eggs in adjacent transverse rows. A greater number of rows of eggs may be placed in a hatchery tray of this type having a given linear dimension than are packed in an egg transport case of the same linear dimensions, and since there are no separators used in the hatchery tray, the number of rows which will fill the tray varies with the size of the eggs being used; and hatchery eggs vary in size with respect to the age and breeds of the layers producing them.

Egg handling devices have been provided in the past in which vacuum cups are provided in regular rectilinear rows corresponding to the spacing of eggs in a shipping case. These devices are provided with a handle by which the operator may lower the device into a crate of eggs; and a source of vacuum in communication with each of the vacuum cups will attach the cup to the egg so that a dozen eggs may be lifted from the case at one time and placed in an egg carton having a dozen compartments arranged in a manner similar to that of the egg case. When a finger operated valve is actuated, the vacuum is cut off and the device is disengaged from the eggs. Attempts have been made to use a similar device for loading eggs into hatchery trays. This has proven unsatisfactory because of the different arrangment of the eggs in the hatchery tray from that of the egg case.

In loading a hatchery tray, the tray is tilted upwardly from a horizontal plane and the eggs are loaded at the lower end of the tray first. The eggs are packed in the egg case with the larger end of the egg uppermost, and they are set in the hatchery tray in the same manner. In transferring eggs with the known vacuum handling devices, the eggs will turn and the upper rows will roll down the incline of the tray so that after they are placed in the tray they must be rearranged by hand. If the size of the eggs being loaded into a hatchery tray is such that it will hold twenty-three rows of eggs and the handling equipment will lift eight rows of eggs at a time, two operations will place sixteen rows of eggs in the tray, but the hatchery tray will hold only seven rows of the third pick-up operation, and therefore, these seven rows must be loaded by hand.

The weight of known egg handling devices is so great that it is very tiring to use such devices, and the efficiency of the operator declines rapidly after a few hours of use.

When a broken egg is lifted with a vacuum type of handling device, some of the contents of the egg is drawn into the device. With known devices this is not discovered until the contents of the egg has been drawn through the valve of the device, making it necessary to dismantle the entire device to clean it.

Consequently, it is an object of the present invention to provide a vacuum-powered hand-operated egg handling device with which rows of eggs arranged in the regular rows of an egg shipping case may be picked up and this arrangement changed to the staggered row arrangement of eggs in a hatchery tray before they are deposited in the hatchery tray, so that further hand operations are not required to arrange them in the hatchery tray.

Another object of the present invention is to provide the above mentioned egg handling device with means for depositing fewer rows of eggs than its total capacity, so that the device may be used for fully loading a hatchery tray.

A further object of the present invention is to provide such an egg handling device which is very rugged but light in weight, and can be operated with one hand.

A still further object of the present invention is to provide an egg handling device which can be easily cleaned out, in the event of fouling due to the contents of a broken egg being drawn into the air passages of the device.

Still another object of the invention is the provision of an egg handling device in which fouling can be immediately seen so that the vacuum may be cut off to prevent clogging the valves.

Still another object of the invention is to provide an egg handling device which is so constructed that the operator has a clear unobstructed view through the device, to the extent that he can see where he is placing it for each operation.

Other objects and advantages of the present invention will become apparent to those skilled in the art, from the following description when read in conjunction with the accompanying drawing, wherein:

FIGURE 1ᵃ is a plan view of the egg handling apparatus of the present invention, showing the manifolds spaced in accordance with the rows of the cells in an egg shipping case;

FIGURE 1ᵇ is a plan view similar to that of FIGURE 1ᵃ, but with the manifolds moved to reduce the space between them and to stagger the rows of egg pick-up vacuum cups;

Figure 1A:
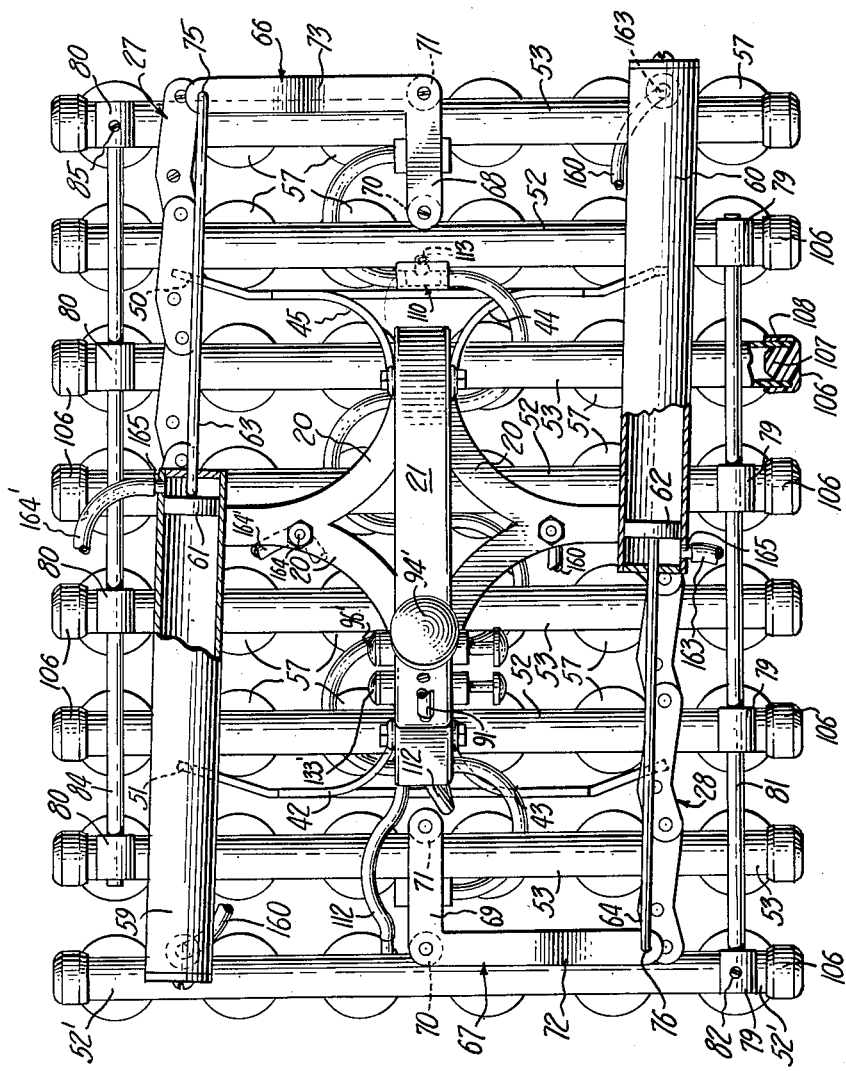
Figure 1B:
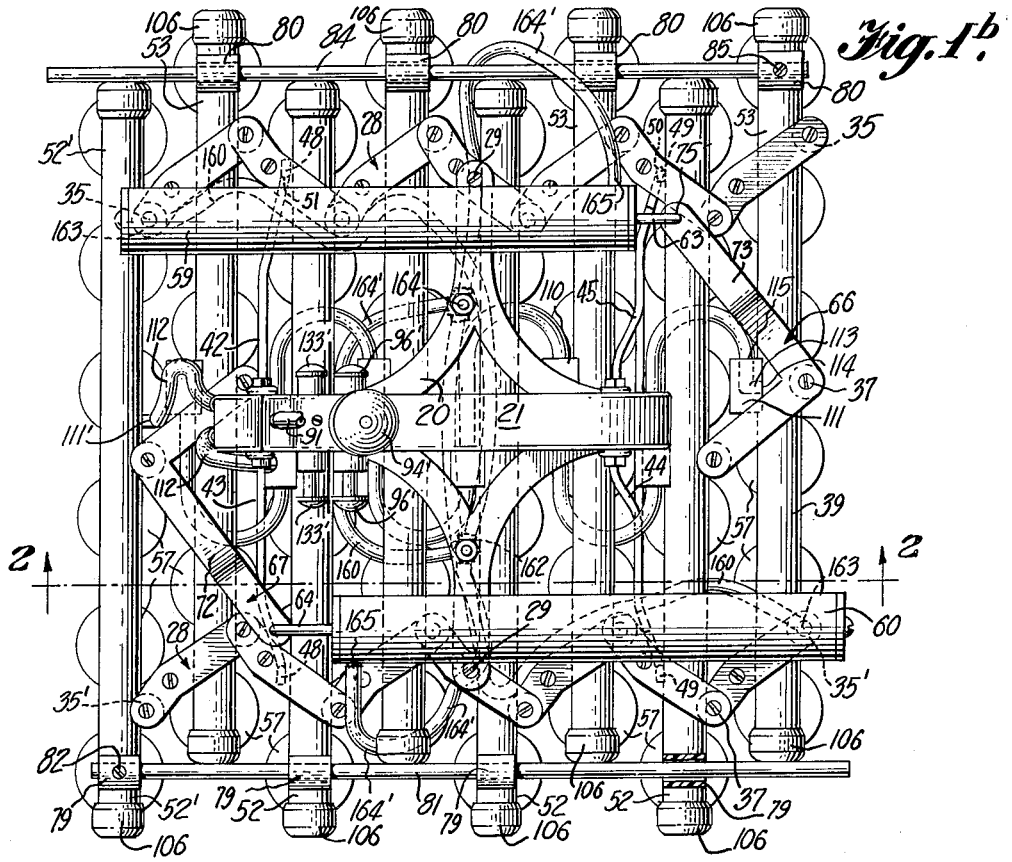
Figure 2:
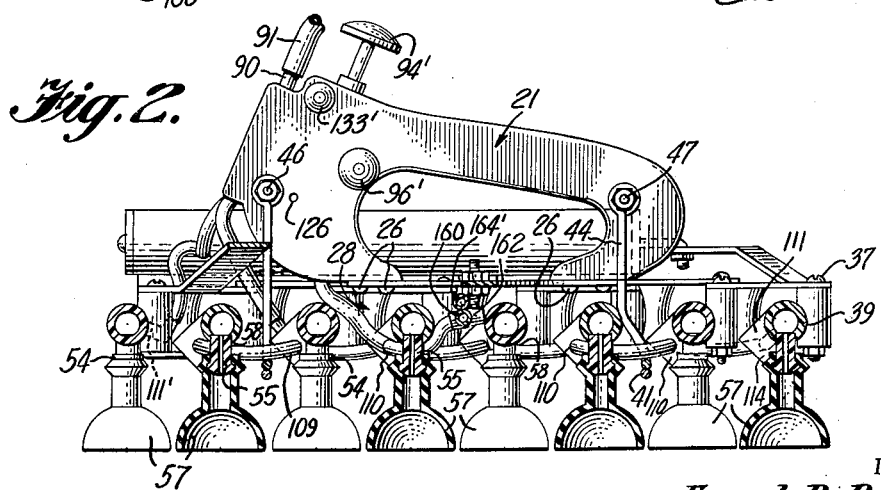
FIGURE 2 is a vertical sectional view taken on the line 2—2 of FIGURE 1ᵇ.
Figure 3:
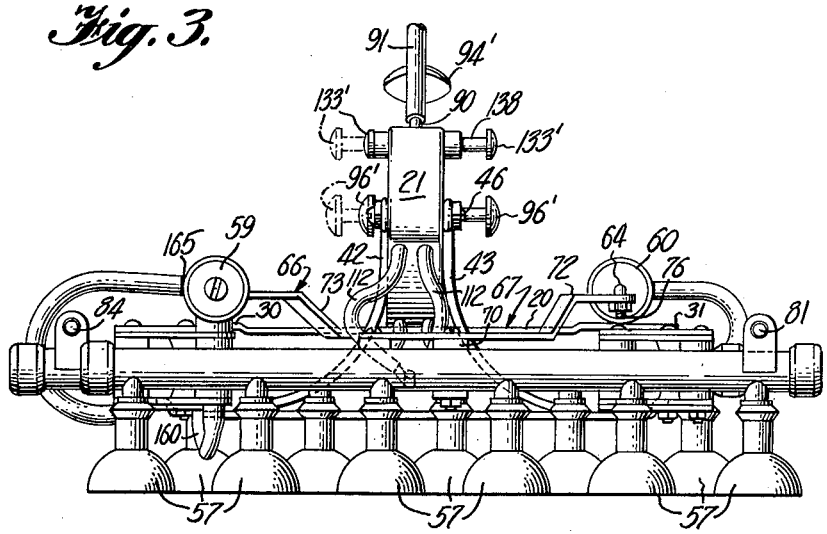
FIGURE 3 is a front end elevational view of the apparatus shown in FIGURE 1ᵇ.
Figure 4:
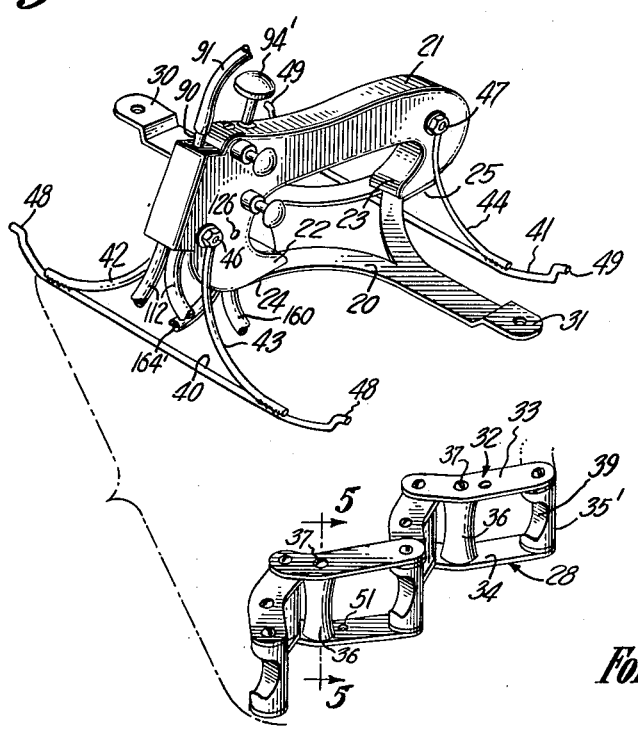
FIGURE 4 is a perspective view of the centrally positioned support member, showing the handle of the apparatus mounted thereon and the stabilizing braces attached to the handle and below it a fragmentary view of one of the foldable manifold mounting linkages, showing the aperture in the lower link member to receive one of the offset ends of one of the stabilizing braces.
Figure 5:
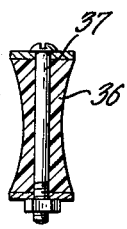
FIGURE 5 is a vertical cross-sectional view of one of the reinforcing spacers of the foldable manifold support linkage.
Figure 6:
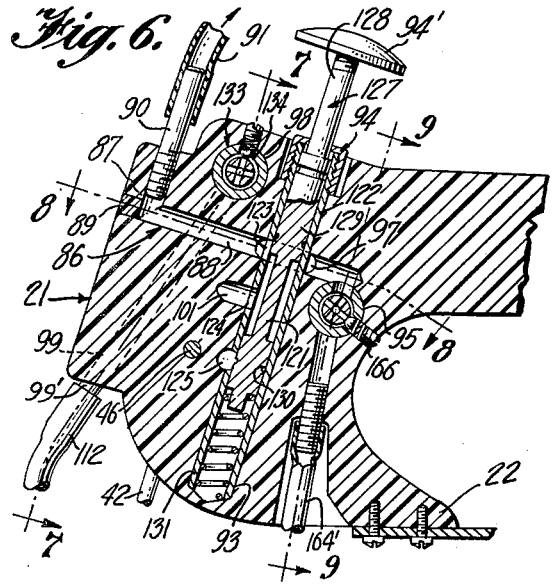
FIGURE 6 is a vertical sectional view of the portion of the handle containing the operating valves.

Adverting now to the drawing, and more particularly to FIGURES 1a, 1b and 4, there is shown a main support plate 20, which is generally cruciform in shape, and may be formed from heavy gauge aluminum plate, fiber glass reinforced synthetic plastic, or the like. A substantially U-shaped handle 21 having inwardly turned feet 22, 23 is mounted on opposite arms 24, 25 of the support plate 20 by means of screws 26 which pass through the plate 20 and are threadedly received in the feet 22, 23, respectively. The handle 21 may conveniently be formed from a thick slab of synthetic plastic, or other suitable light weight material, or it may be cast from light weight metal or synthetic plastic.

A pair of foldable linkages 27, 28 are pivotally mounted by bolts 29 on the upwardly offset ends 30, 31 of the support plate 20. A plurality of links 32 of sheep shank shape pivotally connected together form the foldable linkages 27, 28. Each of the links 32 of the foldable linkages 27, 28 have an upper member 33 and a lower member 34, with pivot support posts 35, holding the upper and lower members 33, 34 in spaced apart relation. Each of the links 32 also is provided with a rigidifying spacer 36 intermediate the support posts and spaced substantially adjacent the support post 35. Each link 32 is pivotally joined to the next adjacent link by means of the pins or screws 37, which pass through the support posts and the members 33, 34. Each of the links 32 have a common support post with the next adjacent link. A concavity 39 is provided in each of the support posts 35, 35' on its forward periphery. The bolts 29 attach the upper member of one of the links 32 in the middle of the linkages 27, 28 to the offset ends 30, 31. The offset ends 30, 31 of the support plate 20 are for the purpose of making the device as compact as possible.

The links 32 will fold toward one another at their pivotal connections, in the manner of a lazy tong. A pair of stabilizing braces 40, 41 having arms 42, 43 and 44, 45 pivotally mounted on the handle 21 by means of the bolts 46, 47 have up struck offset ends 48, 49 which are received in apertures 50, 51 of the lower members 34 of opposite links 32 of the foldable linkages 27, 28 so that the foldable linkages will be securely held and braced with respect to the handle. The pivotal mounting of the braces on the handle 21 permits the braces to follow folding movement of the foldable linkages.

A plurality of manifolds 52, 53 which are made of rigid synthetic transparent plastic cylindrical tubing in the model used for illustrating the invention, but which of course, could be made of other light weight material and may be of any desired cross-sectional shape, are mounted by any well-known means, such as plastic adhesive cement, in the concavities 39 of a pair of support posts 35, 35' of corresponding links 32 of the foldable linkages 27, 28, so that the manifolds 52, 53 extend parallel to each other transversely of the device, and having one manifold in each link 32. Each of the manifolds 52, 53 have a plurality of apertured studs or nipples 54, 55 spaced longitudinally along their lower peripheries. A vacuum cup 57 is mounted on each of the apertured studs 54, 55. The apertured studs 54, 55 are spaced longitudinally of the manifold, in accordance with the spacing of the cells for eggs in a shipping crate, and the aperture of each of said studs places the vacuum cup in communication with the manifold, the manifold being drilled as at 58, to receive studs. By supporting the manifolds 52, 53 on alternate pivot posts in the linkages 27, 28 folding of the linkages 27, 28 will cause the manifolds 52 to move in a lateral direction and the manifolds 53 to move in an opposite lateral direction. The pivotal mountings by the bolts 29, 46 and 47 are in links which move in similar directions during folding of the foldable linkages. The rigidifying spacers 36 are round in cross-section but of reduced diameter intermediate their ends to provide arcuately indented sides to receive the manifolds when the linkages 27, 28 are folded. Also the rigidifying spacers 36 are mounted at the point of offset in the members 33, 34, the offset being most distant from the post 35 which carries the manifold within the link 32. By this arrangement the manifolds may be brought closely together, the parallelogram mounting of the foldable linkages keeping the manifolds parallel to each other at all points of folding movement of the foldable linkages.

A pair of oppositely disposed, double-acting vacuum cylinders 59, 60 having pistons 61, 62 and piston rods 63, 64 are pivotally mounted on the forwardmost support post 35 on one side of the apparatus and the rearwardmost support post 35' on the opposite side of the apparatus, respectively. A pair of bell cranks 66, 67 having levers 68 and 69, respectively, are pivotally mounted between bosses 70, 71 on the manifolds 52, 53, respectively. The upwardly offset arms 72, 73 of the bell cranks 66, 67, respectively, are pivotally attached to the downturned ends 75, 76 of the piston rods 63, 64, respectively. When the pistons 61, 62 are retracted within the cylinders 59, 60 to draw the piston rods 63, 64 inwardly of the cylinder, the bell crank levers 68, 69 move the manifolds 52, 53 relative to each other in an opposite lateral direction and position them closer to each other, folding the foldable linkages, so that all of the plurality of manifolds 52, 53 are moved in a similar manner longitudinally transversely of the apparatus, and the manifolds which were originally spaced in accordance with rows of cells with the spacing of an egg shipping crate are now spaced much closer together in accordance with the rows of eggs in a hatchery tray, and the vacuum cups of manifolds 52 which were originally rectilinearly aligned with the vacuum cups of the manifolds 53 are now staggered with respect to the latter. The spacing of the vacuum cups on a manifold 52 or 53 remains constant, but when the foldable linkages are folded, the staggering of the vacuum cups of the manifolds 52 with respect to the vacuum cups of the manifolds 53 results in the placement of eggs in a hatchery tray so that eggs in one transverse row in the tray are partially intermeshed with eggs of adjacent transverse rows.

Each of the manifolds 52 are provided with apertured bosses 79 at one end of said manifolds, and each of the manifolds 53 are provided with apertured bosses 80 at the opposite end of the manifolds 53. An alignment rod 81 is mounted through the apertures of the bosses 79 and is fixedly attached in the forwardmost boss by means of the set screw 82, the rod 81 slidingly passing through the remainder of the bosses 79. In like manner an alignment rod 84 is mounted in the apertures of the bosses 80, and is fixedly attached in the rearwardmost of the bosses 80 by means of a set screw 85. These alignment rods hold the respective ends of the manifolds 52, 53 in a horizontal plane and also give rigidity to the apparatus.

The forward end of the handle 21 of the apparatus is provided with valves for carrying out the various operations of the device, and in conjunction with the valves a plurality of passageways are drilled in the handle to provide communication between the valves and the vacuum inlets and outlets. A main vacuum passageway 86 is provided, and it may be conveniently formed by drilling the leg 87 first, and then the leg 88 intercepting the leg 87 and closing the outer end of the leg 88 by means of a plug 89. An apertured fitting 90 is threadedly mounted in the leg 87 to receive the hose 91 from a source of vacuum, not shown. A pick-up valve bore 93 is drilled in the handle to intercept the passageway 88 at a point spaced from its innermost end. A pick-up valve 94 is mounted in the bore 93. An adapter valve bore 95 is drilled transversely across the handle 21 to intercept the innermost end of the passageway 88. An adapter valve 96 is mounted in the bore 95. A by-pass 97 is made by undercutting around the pick-up valve bore 93 to place the adapter valve 96 in communication with the source of vacuum. An auxiliary pick-up valve bore 98 extends transversely across the handle 21, the purpose of which will be later explained. The handle 21 is also provided with a main pick-up exhaust passageway 99, which extends from the bottom of the extreme front of the handle to an interconnecting passageway 101 and thence to the auxiliary pick-up valve bore 98. Transversely spaced from the main pick-up exhaust passageway 99 is an auxiliary pick-up exhaust passageway 102, which extends from the bottom of the handle to the auxiliary pick-up bore 98. The interconnecting passageway 101 places the main exhaust pick-up passageway 99 in communication with the pick-up valve bore 93. The interconnecting passageway 101 may be made by drilling the handle in a direction that will connect the bore 93 and passageway 99, and inserting a plug at the outermost end of the passageway 101. A pair of cylinder exhaust passageways 104, 105 extend from the bottom of the handle to the adapter valve bore 95.

Each of the manifolds 52, 53 have their ends closed by removable clean-out plug caps 106. The plug caps 106 are made of a flexible material such as polyethylene plastic, rubber or the like, and consist of a plug portion 107, which snugly fits the inside diameter of the manifolds and a cap portion 108 which securely grips the outer diameter of the manifolds.

Figure 10:
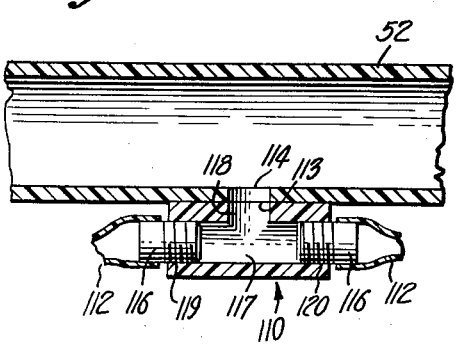
FIGURE 10 is a partial vertical sectional view through one of the manifolds and a fitting by which the manifold is placed in fluid communication with the source of vacuum.

Each of the manifolds 52, 53 are provided with one of the fittings 109, 110, 111, conveniently made of plastic blocks having one concave face to fit the manifold, and fixedly adhered to the manifolds intermediate their ends. The fittings 109, 110, 111 provide means for attaching lengths of tubing 112 and passageways for placing the interior of the manifolds 52, 53 in communication with the lengths of tubing which will place all of the manifolds in communication with the source of vacuum. Passageways are drilled in the fittings and the fitting is adhered to the manifold so that the inlet orifice 113 of the fitting is in communication with an aperture 114 of the manifold. The outlet orifices 115 of the fittings are provided with hose adapters 116, which are threadedly mounted in the outlet orifices 115. The fittings 109, 110 and 111 differ primarily in the number of passageways and outlet orifices and the fitting 110 shown in FIGURE 10 is typical of the group. The fitting 110 has a passageway 117, the inlet orifice 113 of which is in communication with an aperture 114 of the manifold. A passageway 118 intersects the passageway 117 at right angles and provides two outlets 119 and 120 in which the hose adapters 116 are threadedly mounted. The fitting 109 is similar to the fitting 110, but has three outlets, and the fitting 111 has only one outlet. The lengths of hose 112 which connect the several manifolds lie in the plane of the manifolds and are of such length that they will extend between the two extreme positions of adjacent manifolds without collapsing due to a sharp bend. As seen in FIGURE 1ᵃ the tubes 112 are U-shaped, and in FIGURE 1ᵇ they are J-shaped. Fitting 109 has three outlets to connect with the main exhaust passageway 99 and the two manifolds adjacent the manifold on which the fitting is attached. Fitting 111 is mounted on a terminal manifold and requires only one outlet.

The main pick-up valve 94 is provided with a cylindrical valve housing 122, having apertures 123 communicating with the main vacuum passageway 86, an aperture 124, which is in communication with the interconnecting passageway 101, and an aperture 125 which is in communication with a vent passageway 126, the latter passageway extending transversely across the handle 21. A valve plunger 127 for the valve 94 has a stem 128 having two piston sections 129 and 130, and seats on a compression spring 131 mounted in the innermost portion of the valve housing 122. The piston section 130 seats on the spring 131, and the inner terminal end of the stem 128 is received within the coil of the spring 131. The plunger 127 is moved from vacuum-on position to vacuum cut-off position, by pressing the plunger downward against the bias of the spring 131. When the plunger is at vacuum-on position, the flow of air is through the passageway 99, the interconnecting passageway 101, the valve housing 122, around the valve stem portion 128, between the piston sections 129, 130 through the aperture 123 to the main vacuum passageway 86. When the valve plunger 127 is pressed downwardly against the bias of the spring 131, the piston section 129 closes the aperture 123 and places the passageways 99 and 101 in communication with the vent passageway 126 through the aperture 124. The outer end of the passageway 99 is provided with the fitting 99', and a length of plastic hose 112 connects this fitting with the fitting 109 on one of the manifolds 52, convenient to the forward portion of the handle 21, to place that manifold in communication with the source of vacuum. Lengths of plastic hose extend from the fitting 109 to the fiittings on the next adjacent manifold, forwardly and to the rear of the manifold having the fitting 109, to place these manifolds also in communication with the source of vacuum, each manifold to the rear being connected in series to the source of vacuum through the fittings 110 and the fitting 111 on the terminal manifold to the rear of the apparatus. Thus when the valve plunger 127 is in its outwardly biased position, the vacuum cups of each of the manifolds will be under vacuum pressure and will pick up eggs on which the cups are pressed. To release the eggs, the valve plunger 127 is pressed inwardly to cut off the vacuum and to vent the cups to atmosphere and thereby release the eggs.

Since the number of rows of eggs which a hatchery tray will hold varies according to the size of the eggs, the forwardmost manifolds of the present apparatus may be valved so that it will operate with the remainder of the manifolds or separately. For this purpose a two-way auxiliary pick-up valve 133 is mounted in the auxiliary pick-up bore 98. The auxiliary valve 133 is provided with a housing 134, having an aperture 135 communicating with an extension passageway 136 which is in communication with the interconnecting passageway 101. The valve housing 134 also has an aperture 137 which places the housing in communication with the auxiliary exhaust pick-up passageway 102. A plunger 138 for the auxiliary valve 133 is provided with the piston sections 139, 140, 141 having the annular grooves 142, 143 separating the piston sections and an axial bore 144 placing the annular grooves in communication through apertures 145 extending from the annular grooves to the axial bore. When the plunger 138 is moved in the direction shown in FIGURE 7, the annular groove 142 is in communication with the passageway 102 and the annular groove 143 is in communication with the passageway 136 and by means of the axial bore 144 these passageways are placed in communication with each other so that the vacuum cups of the forwardmost manifold 52' are connected with the source of vacuum when the plunger 127 of the main pick-up valve 94 is in outermost position, and the manifold 52' is vented to atmosphere when the valve plunger 127 is depressed, so that the manifold 52' will operate as do the remainder of the manifolds. When the valve plunger 138 is moved in the direction opposite to that shown in FIGURE 7, the piston section 139 is moved to the opposite side of the auxiliary exhaust pick-up passageway 102, exposing the aperture 137 to the reduced stem 146 which vents the passageway 102 to atmosphere through the bearing cap 147, which may be apertured or simply have an oversize journal opening. A spring biased ball bearing 138' releasably holds the plunger 138 in the position to which it has been moved.

To change the relative positions of the manifolds 52, 53 from the rectilinear spacing of the rows of an egg shipping crate to the staggered arrangement of a hatchery tray, the cylinders 59, 60 are operated by means of the adapter valve 96. The valve housing 148 of the valve 96 is provided with the aperture 149, which places the housing in communication with the main vacuum passageway 86 and the apertures 150, 151 place the housing 148 in communication with the cylinder exhaust passageways 104, 105, respectively. The plunger 152 of the adapter valve 96 has three piston sections 153, 154 and 155 separated by the annular grooves 156, 157, these said grooves being in communication with each other through an axial bore 158 and radial ports 159. A hose 160 mounted on a fitting 161 in the passageway 105 extends by means of a branched T 162 to the fittings 163 on the rear of the cylinders 59, 60 to place one side of these cylinders in communication with the passageway 105. In similar manner a hose 164' by means of a branched T fitting 164 extends from the passageway 104 to the fittings 165 on the front ends, respectively, of the cylinders 59, 60 to place the other side of the cylinders 59, 60 in communication with the passageway 104. When the plunger 138 is moved to the right, as viewed in FIGURE 9, the source of vacuum pressure is connected to one portion of the cylinders 59, 60 through the passageway 86, annular groove 156, axial bore 158, annular groove 157 and passageway 105, to draw the piston rods 75, 76 into the cylinders and revolve the bell cranks 66, 67 to move the manifolds 52 in one direction and the manifolds 53 in the opposite direction and bring them closer together and stagger the longitudinal rows of vacuum cups with respect to each other. When the valve plunger 138 is moved to the left, the source of vacuum is connected through the passageway 86, annular groove 157, axial bore 158, annular groove 156 and passageway 104 to place the other end of the cylinders 59, 60 under vacuum pressure to move the piston rods 75, 76 out of the cylinders and swing the bell cranks 66, 67 in a direction to move the manifolds into lateral alignment, so that the longitudinal rows of vacuum cups will be rectilinear. A spring biased ball 166 which seats in the annular grooves 146, 147 will releasably hold the plunger 142 in one position or the other.

The valves 94, 133 and 96 are provided with finger buttons 94', 133' and 96', respectively, for conveniently moving the plungers of these valves.

Figure 7:
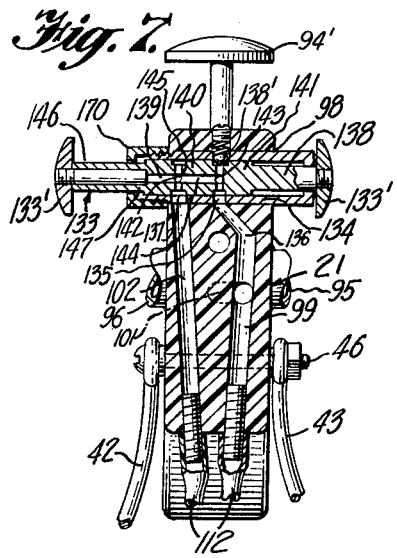
FIGURE 7 is a vertical sectional view taken on the line 7—7 of FIGURE 6.
Figure 8:
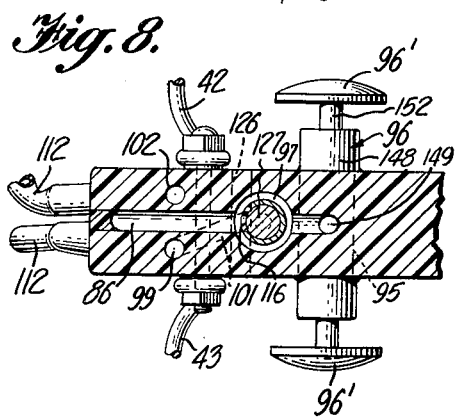
FIGURE 8 is a horizontal sectional view taken on the line 8—8 of FIGURE 6.
Figure 9:
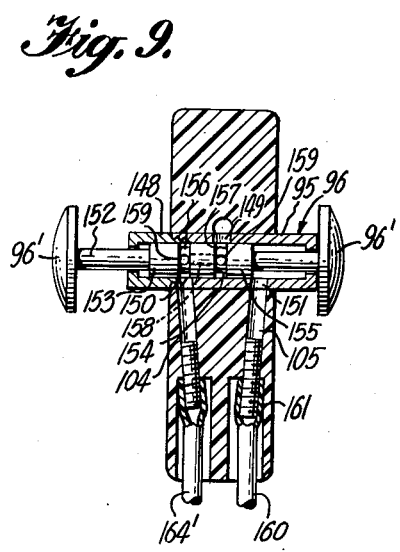
FIGURE 9 is a vertical sectional view taken on the line 9—9 of FIGURE 6.

In operation, the egg handling device is lowered into an egg shipping case with the plunger of pick-up valve 94 depressed to vent the passage 86 to atmosphere through the vent passageway 126 so that the cups 57 will not be under vacuum. The auxiliary valve plunger 138 is moved to the left, as seen in FIGURE 7, to place the auxiliary passageway 100 in communication with the main passageway 86. The plunger of the adapter valve 96 is moved to the left, as seen in FIGURE 9, to laterally align the manifolds 52, 53 so that the suction cups will be arranged in longitudinal rectilinear rows in accordance with the eggs in the shipping crate. A vacuum cup 57 will come into contact with each egg in the layer of eggs in the division of the case in which the device is lowered, eight rows of six eggs in a row, for example. Upon release of the valve plunger 94, the vacuum cups will come under vacuum pressure and the eggs will become attached to the cups. The device with the eggs attached is lifted from the egg shipping case and the plunger of the adapter valve 96 is moved to the right to draw the piston rods 63, 64 into the cylinders 59, 60 and move the manifolds 52, 53 relative to one another in opposite directions to stagger the longitudinal rows of vacuum cups. The device is then lowered into a hatchery tray, and the plunger of the valve 94 is depressed to release the eggs in the hatchery tray. If the size of the eggs is such that seventeen rows of six eggs in each row is required to fill the hatchery tray, the first operation is repeated to place eight additional rows of eggs in the tray. To place the seventeenth row of eggs in the tray, the device is again lowered into the egg shipping crate and eight rows of eggs are picked up, as has been described. However, the front manifold 52' is held over the remaining space in the first hatchery tray, and the plunger of the valve 138 is moved to the right, venting the passageway 100 to atmosphere around the stem of the plunger 138 and the valve retainer cap 170 to release the eggs attached to the manifold 52'. The piston section 139 prevents venting of the other manifolds. The remaining seven rows are then placed in the next hatchery tray.

If desired, the forwardmost of the manifolds 53' may be connected to the source of vacuum with similar valving as the manifold 52', so that it may be operated to release eggs independently or in unison with the remainder of the manifolds.

The guide rods 81 and 84 cooperate with the bell cranks 66 and 67 to fold all of the links 32 in an accordion-like manner. Also, the mounting of the cylinders between the forwardmost manifold and the bell crank pivoted on the rearwardmost manifold on one side and between the rearwardmost manifold and the bell crank on the forwardmost manifold on the other side facilitates expansion or contraction of the folding linkages.

Egg handling apparatus according to the present invention for use in transferring eggs from a thirty dozen egg case to a hatchery tray in which the eggs are arranged in staggered rows, such as in incubators manufactured by the Buckeye Incubator Co. of Springfield, Ohio, and the Chickmaster Incubator Company of Cleveland, Ohio, it is only necessary to provide the apparatus with six manifolds instead of eight as in the embodiment used for illustrating the invention. The use of the six manifold apparatus is similar to that of the eight manifold apparatus.

In the case of apparatus according to the present invention for transferring eggs from the thirty dozen case to hatchery trays in which the eggs are arranged in staggered rows, the apparatus would be provided with five manifolds of six cups each, but the method of using differs from that of handling apparatus having an even number of manifolds.

In apparatus having an odd number of manifolds, the foremost manifold moves in the same direction as the rearwardmost manifold. Therefore, in the operation of apparatus having an odd number of manifolds, the first five rows of eggs are placed with the forward end of the apparatus directed toward the upper or forward end of the hatchery tray. In the placement of the next five rows of eggs in the hatchery tray, the apparatus is rotated after the eggs have been picked up from the case to present the rearwardmost manifold toward the upper or forward end of the hatchery tray. The next five rows of eggs are placed in the hatchery tray with the forwardmost manifold directed toward the upper or forward end of the hatchery tray. Thus, by reversing the apparatus with each deposit of eggs in the hatchery tray, the rows of eggs in the tray will be uniformly staggered.

A separator tray from a shipping case may be conveniently placed near the operator to receive rows of eggs in excess of the number or rows needed to fill a hatchery tray, or as an intermediate depository for rows of eggs from which the needed number of rows may be picked up to complete a hatchery tray. The apertures of the studs 54, 55 are of small diameter compared to the manifolds, and the apparatus is capable of picking up and holding a single row of eggs, even though the vacuum cups of the remainder of the manifolds are empty. Thus, for example, if four rows of eggs are needed to complete a hatchery tray and the apparatus being used is the eight manifold apparatus, eight rows may be picked up from the shipping case and released in the separator tray at the operator's side. Then four rows may be picked up from the separator tray and deposited in the hatchery tray.

While there has been disclosed in the foregoing description a practical embodiment of the egg handling apparatus in accordance with the present invention, it will be understood by those skilled in the art that variations in the implementation of the concept of the invention are within the purview and scope of the invention.

What is claimed is:

1. Egg handling apparatus to be connected with a source of vacuum comprising, support means, a pair of similarly folding linkages having a plurality of links pivotally joined together and having a post at each end of each of said links, a manifold mounted between corresponding posts of said pairs of folding linkages, a plurality of equally spaced vacuum cups mounted on each of said manifold, flexible conduit means for placing said manifolds in fluid communication with said source of vacuum, valve means operatively associated with said conduit means for establishing and interrupting said vacuum in said conduit means, lever means mounted on said apparatus and pivotally coupled between a pair of manifolds for folding said linkages and moving said manifolds endwise relative to one another in opposite directions, the vacuum cups of one manifold being rectilinearly alignable with the vacuum cups of an adjacent manifold, a vacuum cylinder mounted in said apparatus having a piston coupled with said lever means for moving said manifolds, said lever being mounted between one manifold and the next adjacent manifold, means mounted on said apparatus for holding all of said alternate manifolds in end alignment, conduit means for placing said cylinder in fluid communication with said source of vacuum, and finger operated valve means mounted in said apparatus in addition to said first mentioned valve means for establishing and interrupting said fluid communication with said cylinders.

2. In an egg handling apparatus to be connected with a source of vacuum as claimed in claim 1, an upstanding handle mounted on said support means and said first mentioned and said second mentioned finger actuated valve means being mounted on said handle.

3. In an egg handling apparatus to be connected with a source of vacuum as claimed in claim 1, at least one additional finger operated valve means in addition to said first mentioned and said second mentioned valve means for establishing and interrupting said vacuum to selected ones of said manifolds independently of the other of said manifolds.

4. In an egg handling apparatus to be connected with a source of vacuum as claimed in claim 1, said manifolds being transparent tubes and said manifold having removable clean out caps at each end thereof.

5. In an egg handling apparatus to be connected with a source of vacuum as claimed in claim 1, said links of said folding linkages having upper and lower members and a rigidifying member mounted intermediate the ends of said links.

6. Egg handling apparatus to be connected to a source of vacuum comprising, support means, a folding linkage means having a plurality of links pivotally joined together at their ends to fold upon each other in alternate directions of folding, a plurality of manifolds including a forwardmost and rearmost manifold, each of said manifolds mounted adjacent one end of each link, a plurality of equally spaced depending nipples mounted on each of said manifolds, a vacuum cup mounted on each of said nipples and in fluid communication with said manifold through said nipple, flexible conduit means for placing said manifolds in fluid communication with said source of vacuum, finger actuated valve means operatively associated with said conduit means for establishing and interrupting said vacuum in said conduit means, lever means mounted in said apparatus and coupled between pairs of said manifolds for folding said linkage and moving said manifolds endwise relative to each other, said vacuum cups of one manifold being rectilinearly alignable with the vacuum cups of adjacent manifolds, oppositely disposed vacuum cylinders mounted in said apparatus having pistons coupled with said lever means for moving said manifolds, each of said cylinders being mounted on one of said forwardmost and rearmost manifolds and said lever being mounted between the other of said forwardmost and rearmost manifolds and the next adjacent manifold, guide means for holding all said alternate manifolds in end alignment, conduit means for placing said cylinders in fluid communication with said source of vacuum, and a second finger actuated valve means mounted in said apparatus for establishing and interrupting said fluid communication with said cylinders.

7. In an egg handling apparatus to be connected with a source of vacuum as claimed in claim 6, an upstanding handle mounted on said support means and said first mentioned and said second mentioned finger actuated valve means being mounted on said handle.

8. In an egg handling apparatus to be connected with a source of vacuum as claimed in claim 6, at least one additional finger operated valve means in addition to said first mentioned and said second mentioned valve means for establishing and interrupting said vacuum to selected ones of said manifolds independently of the other of said manifolds.

9. Egg handling apparatus to be connected to a source of vacuum comprising, a support plate, a pair of folding linkages having a plurality of links including forwardmost and rearmost terminal links joined together by pivot means common to adjacent links so that they will fold accordion-like, each of said links having an upper and lower member spaced apart by posts mounted at the ends of each link, said pivot means passing through said posts common to adjacent links, each of said linkages pivotally connected adjacent each lateral edge of said support plate and depending therefrom, said pivot means extending through said support plate and the upper member of corresponding centrally disposed links of said pair of linkages, an upstanding handle mounted longitudinally on said support plate, a pair of stabilizing braces pivotally mounted on said handle and pivotally attached to the lower member of corresponding links adjacent the front and back of said handle, transparent tubular manifolds similarly mounted between corresponding posts of each of said linkages, a removable clean out cap closing the ends of each said manifolds, a plurality of spaced nipples dependingly mounted on said manifolds, said manifolds and said nipples having apertures in registry, a vacuum cup mounted on each of said nipples and in fluid communication with said manifold through said apertures, flexible conduit means for connecting each of said manifolds with said source of vacuum, finger actuated valve means for establishing and interrupting said vacuum in said conduit means, a pair of bell cranks, each of said bell cranks having a lever and an actuating arm, said levers pivotally connecting each of said manifolds in the terminal pairs of manifolds for moving said manifolds endwise in opposite directions relative to each other, apertured bosses on the opposite end of adjacent manifolds, a pair of rods, each of said rods mounted in the apertured bosses on each side of said apparatus, said rod being fixed in one boss and slidable in the other of said bosses, whereby movement of manifolds intermediate said end pairs of manifolds will track in alignment with movement of said end pairs of manifolds, a pair of oppositely disposed double acting vacuum cylinders mounted on pivots upstanding from the forwardmost and rearwardmost links respectively, pistons mounted in said cylinders, said pistons having piston rods pivotally connected to said bell crank actuating arms respectively, conduit means between said source of vacuum and each end of said cylinders, a second valve means having a finger actuated plunger movable to one position for establishing vacuum from said source of vacuum on one side of said piston and movable to another position for establishing vacuum from said course of vacuum on the other side of said piston.

10. In an egg handling apparatus to be connected to a source of vacuum as claimed in claim 9, at least one additional finger operated valve means in addition to said first mentioned and said second mentioned valve means for establishing and interrupting said vacuum to selected ones of said manifolds independently of the other of said manifolds.

11. Egg handling apparatus to be connected with a source of vacuum comprising, a support, a plurality of elongated manifolds having their ends extending laterally relative to opposite sides of said support, said manifolds being in the same plane, a plurality of interconnected folding links operatively connected to and supporting all said manifolds and operable to permit relative endwise movement of adjacent manifolds, said links being mounted on said support, a plurality of vacuum cups spaced along each of said manifolds, said vacuum cups being in fluid communication with said manifolds, each of said manifolds being in fluid communication with the source of vacuum through conduit means, a valve in said conduit means for establishing and interrupting the fluid communication between said manifolds and said source of vacuum, and fluid actuated means mounted on said apparatus and lever means pivotally connected to said fluid actuated means and cooperating with said links to move said adjacent manifolds endwise whereby alignment of said vacuum cups on adjacent manifolds may be selectively varied at will to align with the rectilinear arrangement of eggs in a filler of a shipping case and the staggered arrangement of eggs in a hatchery tray.

12. Egg handling apparatus to be connected with a source of vacuum comprising, a support, a plurality of elongated manifolds having their ends extending laterally relative to opposite sides of said support, said manifolds being in the same plane, a plurality of interconnected folding links operatively connected to and supporting all said manifolds and operable to permit relative endwise movement of adjacent manifolds, said links comprising upper and lower members pivotally connected at their ends, said manifolds being connected to the upper and lower members at said ends, said links being mounted on said support, a plurality of vacuum cups spaced along each of said manifolds, said vacuum cups being in fluid communication with said manifolds, each of said manifolds being in fluid communication with the source of vacuum through conduit means, a valve in said conduit means for establishing and interrupting the fluid communication between said manifolds and said source of vacuum, and fluid actuated means mounted on said apparatus and lever means pivotally connected to said fluid actuated means and cooperating with said links to move said adjacent manifolds endwise whereby alignment of said vacuum cups on adjacent manifolds may be selectively varied at will to align with the rectilinear arrangement of eggs in a filler for a shipping case and the staggered arrangement of eggs in a hatchery tray.

13. Egg handling apparatus to be connected with a source of vacuum comprising, a support, a plurality of elongated manifolds having their ends extending laterally relative to opposite sides of said support, said manifolds being in the same plane, an interconnecting folding link means for movably mounting said manifolds to provide relative endwise movement between adjacent manifolds, said means for movably mounting said manifolds including means for movably spacing said manifolds predetermined distances from each other, a plurality of vacuum cups spaced along each of said manifolds, said vacuum cups being in fluid communication with said manifolds, each of said manifolds being in fluid communication with the source of vacuum through conduit means, a first valve in said conduit means for establishing and interrupting the fluid communication between said manifolds and the source of vacuum, and fluid actuated piston means mounted on said apparatus to effect relative endwise movement of adjacent manifolds and simultaneously space said manifolds predetermined distances apart, said piston means being in fluid communication with said vacuum source, finger operated valve means positioned adjacent said first valve for controlling the vacuum communication to said piston, whereby alignment of said vacuum cups on adjacent manifolds may be selectively varied at will to align with the rectilinear arrangement of eggs in a filler of a shipping case and the staggered arrangement of eggs in a hatchery tray.

14. The structure of claim 13, including pivoting lever means connecting adjacent manifolds and operable by said piston means to relatively move adjacent manifolds endwise.

15. Egg handling apparatus to be connected with a source of vacuum comprising, a support, a plurality of elongated manifolds having their ends extending laterally relative to opposite sides of said support, said manifolds being in the same plane, a plurality of interconnected folding links operatively connected to and supporting all said manifolds and operable to permit relative endwise movement of adjacent manifolds, said links being mounted on said support, a plurality of vacuum cups spaced along each of said manifolds, said vacuum cups being in fluid communication with said manifolds, each of said manifolds being in fluid communication with the source of vacuum through conduit means, a valve in said conduit means for establishing and interrupting the fluid communication between said manifolds and said source of vacuum, fluid actuated piston means mounted on said apparatus to effect relative endwise movement of adjacent manifolds and simultaneously space said manifolds predetermined distances apart, said piston means being in fluid communication with said vacuum source, finger operated valve means positioned adjacent said first valve for controlling the vacuum communication to said piston, pivoting lever means connecting adjacent manifolds and operable by said piston means to relatively movable adjacent manifolds endwise, whereby alignment of said vacuum cups on adjacent manifolds may be selectively varied at will to align with the rectilinear arrangement of eggs in a filler of a shipping case and the staggered arrangement of eggs in a hatchery tray.

References Cited in the file of this patent

UNITED STATES PATENTS

| 1,987,336 | Powell | Jan. 8, 1935 |
| 2,666,665 | Whitcher et al. | Jan. 19, 1954 |
| 2,798,757 | Jackson | July 9, 1957 |
| 2,803,485 | Page et al. | Aug. 20, 1957 |
| 2,840,415 | Morris | June 24, 1958 |
| 2,903,290 | Morris et al. | Sept. 8, 1959 |

FOREIGN PATENTS

| 26,209 | Finland | Nov. 30, 1953 |